United States Patent Office 3,265,649
Patented August 9, 1966

3,265,649
PROCESS FOR REFINING POLYOLEFINS BY AN ADDITION OF METAL SALTS OF INORGANIC OR ORGANIC ACIDS
Volkert Faltings, Backemstr. 10, Gelsenkirchen-Buer, Germany; Franz-Josef Meyer, Landstr. 161, Gladbeck, Germany; and Alfred Schäffler, Droste-Hulshofstr. 23, Gelsenkirchen-Buer, Germany
No Drawing. Filed Jan. 8, 1962, Ser. No. 165,986
Claims priority, application Germany, Jan. 9, 1961, Sch 29,029
4 Claims. (Cl. 260—23)

Low-pressure polyethylene, of course, still contains traces of halogen-containing catalyst residues which are difficult to remove completely. When a low-pressure polyethylene is processed by conventional methods such as die casting or extrusion, a penetrating odour is evolved at the processing temperatures of from about 200 to 300° C., accompanied by a yellow discolouration and an embrittlement of the substance. Those parts of the processing machinery where the hot polyethylene contacts metal become corroded.

A variety of processes are known for obviating these disadvantages. For instance, to inhibit discolouring and embrittlement antioxidants are added, for instance, alkylated phenols and amines having a molecular weight of preferably above 200. It is found that the odour is reduced as well, since antioxidants reduce the attack of polyethylene by oxygen which otherwise occurs at high temperatures.

To obviate or reduce corrosion, it has been proposed that compounds of metals of groups II–IV of the periodic table with inorganic or organic acids be added to low-pressure polyethylene. Calcium stearate and zinc stearate are the substances mostly used as additives of this kind. An addition of these substances lead, as has long been known, to a considerable reduction in the tendency of plasticised polymers to stick to metal rollers or other processing machinery, so that working temperatures can be reduced.

When the halogen which is the reason for the corrosion is removed, the metal salt is converted to metal halide and to organic acid. Since calcium chloride is highly hydgroscopic, it attracts atmospheric moisture and therefore increases the aqueous contents of the in itself a hydrophobic polyolefin. The inventors have discovered that when granular polyethylene which had been in store for several months was extruded into tubes, small bubbles were noted and the reason for their existence was found to be the hygroscopicity of the calcium chloride or zinc chloride. Articles prepared from such products are unsatisfactory in use.

In endeavours to find additives which act like the substances hereinbefore described but which are free from the disadvantages mentioned, it has surprisingly been found that compounds of metals of group I of the periodic table, such as sodium and/or potassium, with inorganic or preferably organic acids having a chain length of from 8 to 30 carbon atoms, are very effective in inhibiting corrosion in the processing of polyolefins. For instance, it has been found that an addition of sodium stearate obviates the hygroscopicity disadvantages just outlined.

Also, it has been found in comparative experiments with calcium stearate that the corrosion-inhibiting effect is achieved with a relatively reduced addition of sodium stearate. The smell and discolouration associated with the processing of the pure polymer are also reduced, and the sliding properties of the plasticised polyolefin are improve considerably.

The additive salts according to the invention can be introduced in a finely divided solid form into the polymer before or during plasticisation in manner known per se. A particular advantage of the invention is that these alkali salts can be sprayed in solution form, for instance, in aqueous solution, onto the polymer to be treated, such salts being deposited substantially as a monomolecular film and therefore being distributed uniformly in the polymer. For want of a solvent, the known metal salts have to be introduced dry. When metal salts having an organic acid radical having a chain length of <8 carbon atoms is used, it is found that corrosion is not reduced greatly and that the products thus treated evolve an unpleasant smell when they are processed.

As a rule, it is sufficient to add from 0.01 to 1 weight percent of the acid-binding salts referred to the polymer.

*Example 1.*—0.05 weight percent of sodium stearate related to the polyethylene is sprayed in aqueous solution onto low-pressure powdery ethylene which is in a drier and which is still wet from processing, whereafter the product is dried in a vacuum paddle drier.

After this refining and drying treatment, the polyethylene powder is converted into granulate in a screw-press having a wet cutting device, then worked up into tubes in an extruder at temperatures around 230° C. The same granulate is reprocessed after it has been stored at 20° C. and 90% relative atmospheric humidity for 6 months. In both cases it was found that there was no corrosion in calibration and inside the extruder after 20 hours continuous processing. The tubes were parted off into 10 metre lengths, and no formation of bubbles was observed.

*Example 2.*—The low-pressure polyethylene used in Example 1 is dried without an addition of sodium stearate. 0.05 and 0.2 weight percent of calcium stearate are introduced into the dry polyethylene powder in a high-speed rapid mixer in two experiments. The two products thus treated were processed as set forth in Example 1. The product mixed with 0.5 weight percent of calcium stearate causes corrosion in the pipe former after 10 hours processing into a pipe; after 20 hours processing the corrosion still increases considerably. The product treated with an addition of 0.2 weight percent of calcium stearate and processed as in Example 1 causes no corrosion even after a processing time of 20 hours.

These products are stored in granular form for 6 months at 90% relative humidity and at a temperature of 20° C., then processed into pipes. Upon inspection the pipes are found to have bubbles or blisters, and the product having the greater addition of calcium stearate has more bubbles.

What is claimed is:
1. A stabilized polymeric composition comprising a polyolefin containing the residue of a metal halide catalyst and, dispersed uniformly in said polyolefin, from

0.01 to 1.0% based on the weight of the polyolefin of a stabilizer selected from the group consisting of sodium and potassium stearate.

2. A stabilized polymeric composition as set forth in claim 1 in which said polyolefin is polyethylene.

3. A stabilized polymeric composition as set forth in claim 1 in which said stabilizer is sodium stearate.

4. A process for the improvement of polyolefins which contain the residue of a metal halide catalyst, said method comprising spraying onto said polyolefin from 0.01 to 1.0%, based on the weight of the polyolefin, of a stabilizer selected from the group consisting of sodium stearate and potassium stearate, in dissolved form.

References Cited by the Examiner

UNITED STATES PATENTS

| | | | |
|---|---|---|---|
| 2,653,919 | 9/1953 | Hunter | 260—45.85 |
| 2,930,783 | 3/1960 | Weber et al. | 260—93.7 |

FOREIGN PATENTS 575,436  5/1959  Canada.

JOSEPH L. SCHOFER, *Primary Examiner.*

JOSEPH R. LIBERMAN, *Examiner.*

D. E. OLSON, E. M. OLSTEIN, F. L. DENSON,
*Assistant Examiners.*